United States Patent Office 2,867,102
Patented Jan. 6, 1959

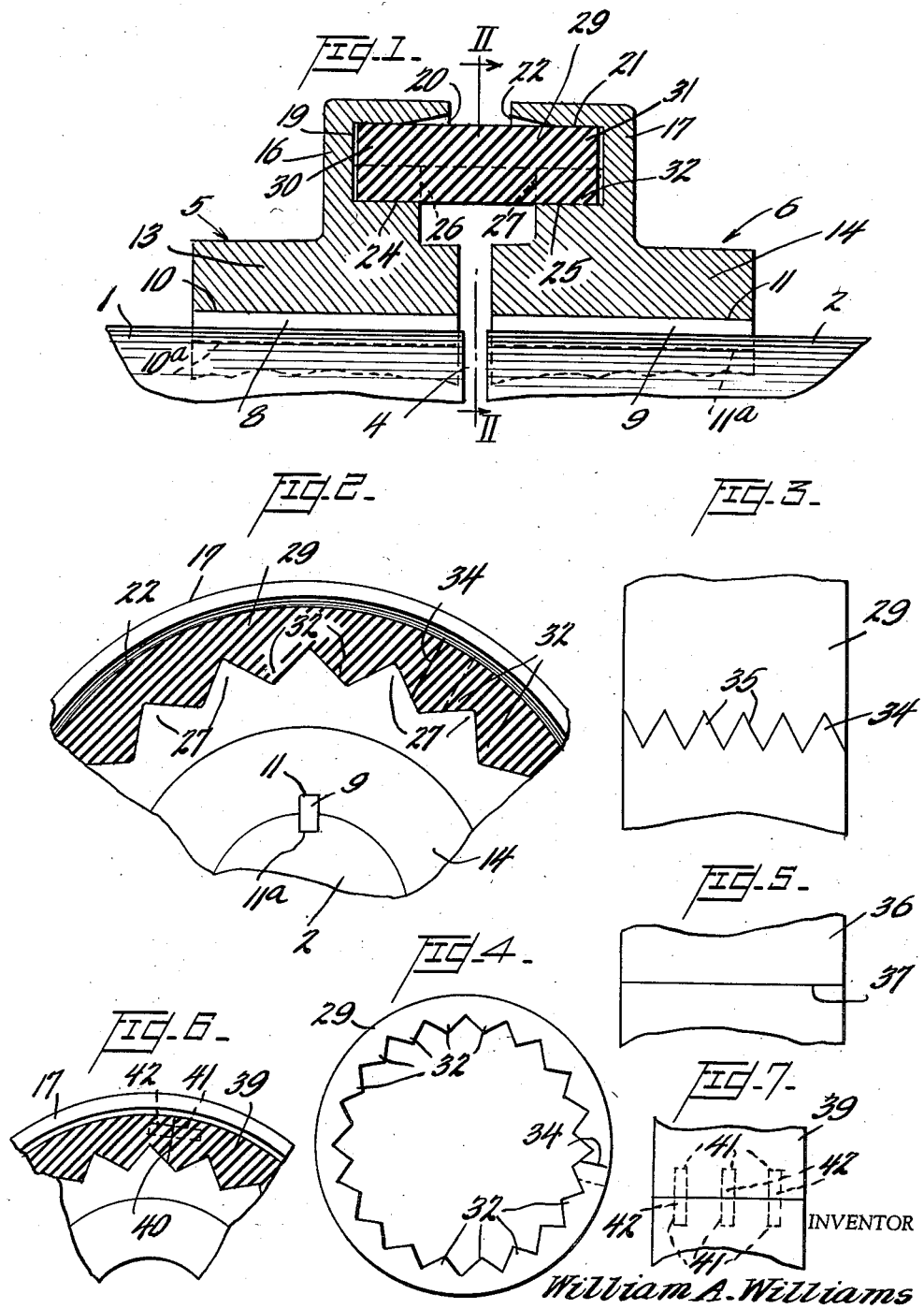

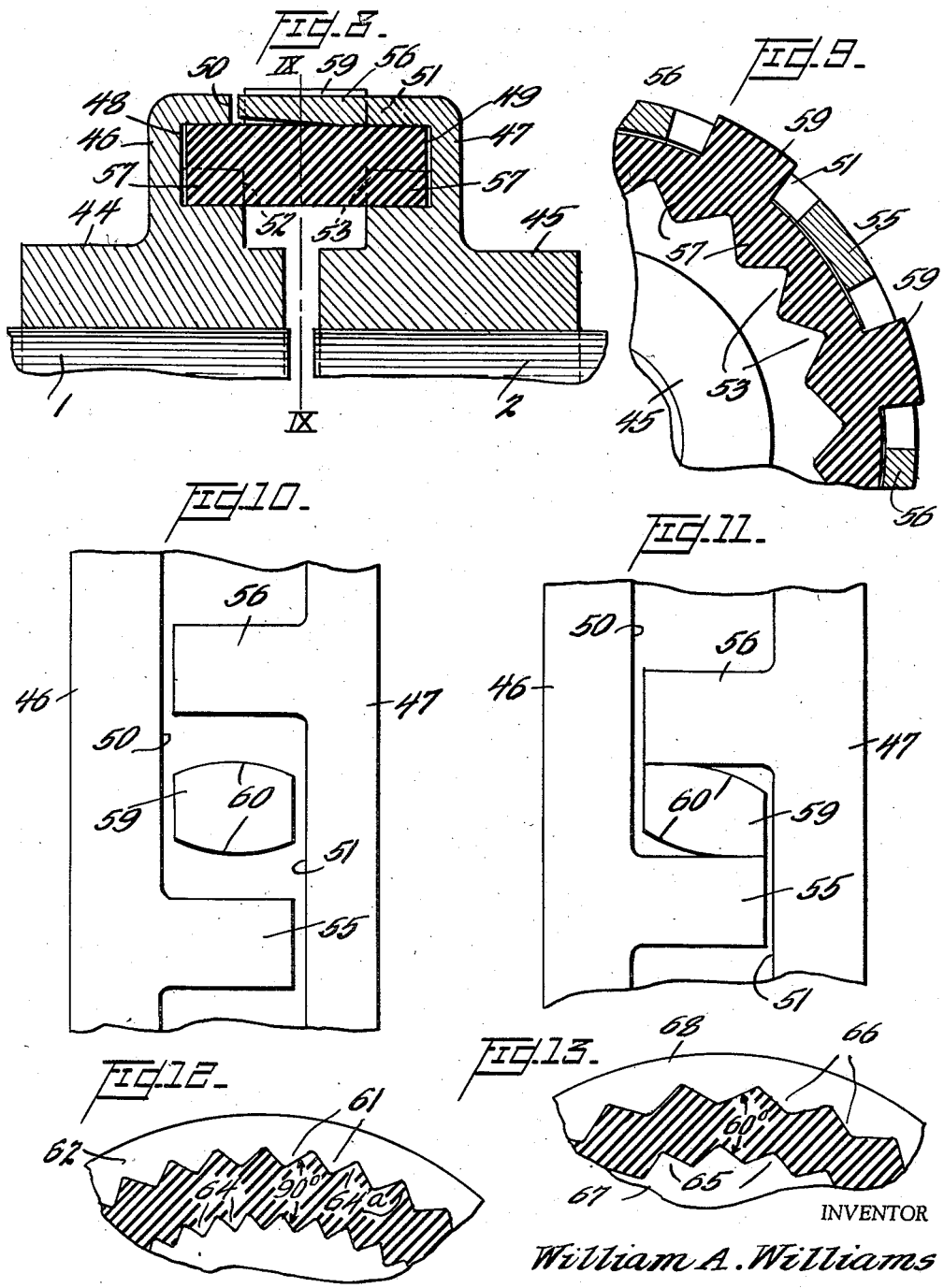

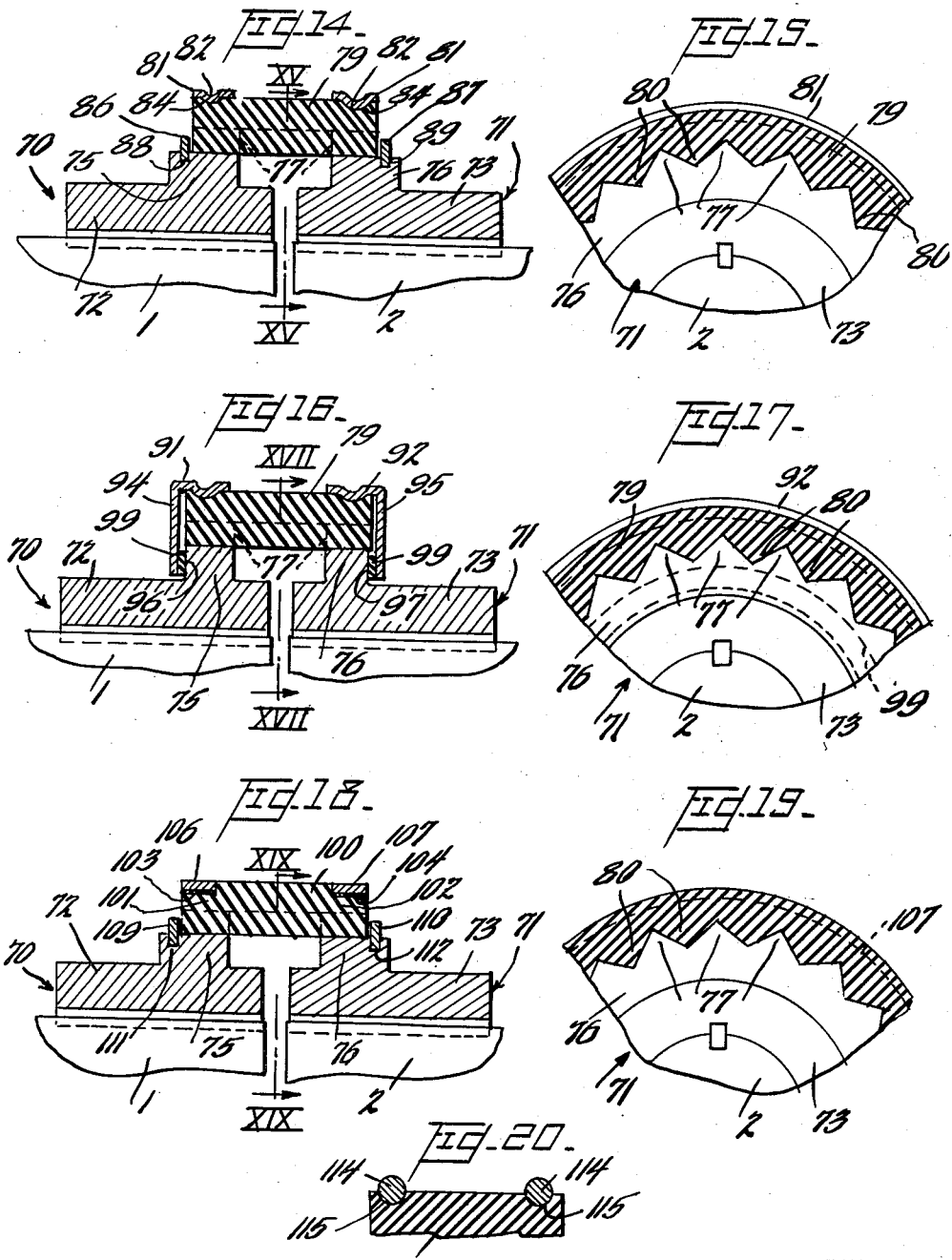

2,867,102

FLEXIBLE COUPLINGS FOR SHAFTS

William A. Williams, Philadelphia, Pa., assignor to T. B. Wood's Sons Company, a corporation of Pennsylvania Application February 13, 1956, Serial No. 565,147

12 Claims. (Cl. 64—11)

This invention relates to flexible couplings for shaft or rod elements, particularly of the type adapted to connect such elements end to end and to provide for the transmission of torsional power therebetween.

An object of this invention is to provide a flexible coupling in which the structure is such that a flexible connecting member and cooperating engaging members of said elements are so formed or shaped that the greater the amount of power to be transmitted the greater and more secure will become the engagement between the connecting member and said engaging members.

A further object of this invention is to provide a flexible coupling in which the shaft elements to be connected can operate smoothly even though slightly out of alignment, and in which the misalignment can be compensated for by movement within the material of the flexible connector member itself without any relative movement between the flexible connector and the engaging members of the shafts so as to avoid any wear whatever from frictional movement.

Another object of this invention is to provide a flexible coupling in which a flexible connecting member is arranged to extend axially between opposed socket members arranged on the shaft ends, the said connecting member being tubular, but split longitudinally so as to facilitate assembly and removal and having the surfaces of said connecting member engaging each other at said splits so formed as to interlock in such a way as to avoid distortion of the connecting member when under torsional load.

In the accompanying drawings several embodiments and modifications of various details of the invention are illustrated by way of example.

In the drawings, Figure 1 is a cross sectional view, on line I—I of Fig. 2, a flexible shaft coupling according to the invention, taken in a longitudinal plane extending radially of the coupling and the shafts coupled thereby, the lower portion being omitted for simplicity of illustration.

Figure 2 is a transverse sectional view taken on the line II—II of Fig. 1.

Figure 3 is a side view of a joint of the edges of an embodiment of a flexible connector removed from its assembled location in the coupling.

Figure 4 is an end view, on a smaller scale, of a flexible coupling member, according to the embodiment represented in Figs. 1, 2 and 3, representing the flexible connector as removed from the coupling.

Figure 5 is a view similar to Fig. 3 of a modified embodiment of flexible connector in which the interlocking teeth at the edges of split portion are omitted.

Figure 6 is a cross-sectional view on a reduced scale, but, similar to Fig. 2 representing a further modification of the flexible connector in which the edges of the split are provided with registering molded recesses and dowels for holding the edges against relative movement when under torsional driving stress.

Figure 7 is a view similar to Fig. 3 of the modified flexible connector joint of Fig. 6.

Figure 8 is a view similar to Fig. 1 of a different embodiment in which the flexible connector is provided with outwardly extending lugs cooperating with oppositely extending teeth of the coupling members, respectively.

Figure 9 is a fractional view in cross section on the line IX—IX of Fig. 8.

Figure 10 is a fractional view of a developed portion of the outer surface of the embodiment according to Figs. 8 and 9.

Figure 11 is a view according to Fig. 10 representing the coupling as under power transmitting stress with the flexible connector somewhat distorted thereby.

Figure 12 is a somewhat diagrammatic cross sectional view of a portion of a flexible connector and coupling socket member in which the flexible connector is provided with molded teeth on both its inner and outer faces and the coupling socket has corresponding grooves and teeth for interlocking therewith to transmit torsional drive.

Figure 13 is a view similar to Fig. 9 in which the shape of the teeth is somewhat different than in Fig. 12, the angle between opposing faces of the respective inner and outer faces of corresponding teeth of the connector being smaller than in Fig. 12.

Figure 14 is a longitudinal sectional view of a further modified embodiment of the invention.

Figure 15 is a sectional view on the line XV—XV of Figure 14.

Figure 16 is a longitudinal sectional view of still another modified embodiment of the invention.

Figure 17 is a sectional view on the line XVII—XVII of Fig. 16.

Figure 18 is a longitudinal sectional view of another modified embodiment of the invention.

Figure 19 is a sectional view on the line XIX—XIX of Fig. 18.

Figure 20 is a sectional view of a detail of another embodiment similar to that of Fig. 15 except that a band having a round cross section is employed at the ends of the connector.

In Fig. 1 of the accompanying drawings numerals 1 and 2 represent shafts arranged substantially coaxially and between which rotary or torsional power is to be transmitted. As is customary the adjacent ends of the shafts are separated by a small gap 4 to allow for slight freedom of motion providing for the possibility of a flexible connection therebetween to absorb shocks, that is, abrupt variation of the drive or resistance to drive and also to accommodate any small relative movements resulting from slight misalignment of the shafts.

Disposed on the adjacent ends of shafts 1 and 2 in oppositely disposed relation are hub members 5 and 6, respectively. These hub members have axial openings through which shafts 1 and 2 extend respectively and the hub members are secured against turning on their shafts by keys 8 and 9 seated in keyways 10, 10a and 11, 11a in the respective shaft and hub assemblies.

Each of the inner or base portions 13, 14 of hubs 4, 5 is provided with an outwardly extending annular flange designated 16, 17 respectively. These flanges are shown as being formed integrally with the base portion 13, 14 of hubs 4, 5 respectively, but it is obvious that the said flanges could be formed separately and secured on the base portions by any suitable means such as keys and keyways.

Each of the flanges 16, 17 are of substantial thickness in the axial direction of the shafts. Flange 16 is provided with an annular recess 19 in its face 20, opening toward flange 17, and flange 17 is provided with a similar annular recess 21 in its inner face 22, opening toward flange 16. These recesses 19 and 21 are of similar extent and size and are arranged substantially coaxially of the shafts 1 and 2.

According to the embodiment of the invention represented by Figs. 1, 2 and 3 of the drawing the inner walls 24 and 25 which define the inner limits of recesses 19 and 21 are formed with teeth 26, 27, respectively, extending around the recesses. The teeth are represented as having angles at their outer and inner extremities of about 90°. Located between the hub members is an annular sleeve-like member 29, of elastic material, such as molded rubber, extending substantially coaxially of the shafts 1 and 2 and having its end portions 30, 31 extending into recesses 19, 21, respectively. The inner surface of connector sleeve 29 is formed with teeth 32 of similar size and shape as teeth 26 and 27 of the hub flanges, and, when in assembled relation, are in intermeshing engagement with the aforesaid teeth.

In Fig. 4 an end view of the molded rubber connector is shown separated from the other parts of the coupling. It will be noted that due to the connection being molded in tubular or cylindrical sleeve shape it retains such shape when separate from the other parts. However, the flexibility of the said connector sleeve is such that it can be assembled and disassembled from its position of use connecting the coupling hubs without requiring removal of said hubs from their shafts or even displacement along said shafts. To facilitate such assembly and removal of the connector sleeve it is provided with a longitudinally extending split indicated by numeral 34. In this embodiment the split is not straight but of zig-zag formation providing a set of inter-locking teeth 35. These teeth serve, in operation, to prevent or resist relative longitudinal displacement of the edges of the connector sleeve at the split which would tend to occur when under the torsional stress existing therein when transmitting power between the shafts 1 and 2.

In the event coupling is to be used for transmitting lighter power loads the teeth connecting the edges of the connector sleeve may be omitted, as in the embodiment represented in Fig. 5, in which the elastic connector sleeve 36 has a straight split 37.

In another embodiment represented by Figs. 6 and 7, an elastic connector sleeve 39 is represented as having a straight split 40, and in order to adapt this sleeve to transmit heavier loads without too great distortion the faces of the split are provided with recesses 41 extending in both directions. In these recesses are disposed dowel pins 42, the said pin and recess arrangement serving the same purpose as the teeth 35 in the embodiment shown in Figs. 1–3, namely, resisting relative longitudinal displacement of the edges of the sleeve when under heavy load.

In the embodiment of the invention represented in Figs. 8 to 11, hubs 44 and 45 are provided with flanges 46 and 47, respectively. These flanges are each provided with an annularly extending recess 48, 49, respectively, in the face thereof 50, 51, respectively, adjacent the other hub, and the inner faces of these recesses are provided with teeth 52, 53, resembling those in Figs. 1–4 and serving the same purpose. However, the outer walls of the flanges beyond the recesses are provided with longitudinally extending abutment fingers 55, 56, respectively, extending oppositely toward the opposed flange, and the fingers of each flange are spaced apart from each other angularly leaving gaps of substantial widths therebetween. When assembled on the shafts the coupling hubs are so arranged angularly with respect to each other that the abutment fingers of the respective coupling members are also spaced from each other angularly. In this embodiment an elastic connector sleeve is employed which in addition to having teeth 57 on its inner face, is also provided with outwardly extending, angularly spaced abutment lugs 59. These lugs are so spaced angularly as to be arranged intermediate a pair of abutment fingers 55, 56. The abutment lugs 59 are preferably somewhat bulging laterally as indicated at 60. Fig. 11 illustrates the condition of the connector sleeve existing when under heavy torsional load. Under these conditions the fingers 55 and 56 are displaced angularly toward each other and come into engagement with the elastic abutment lugs 59 whereupon the resistance to further relative turning movement of the coupling hubs is considerably increased and will increase with an increasing increment upon further relative movement.

In Figure 12 a further embodiment is represented which is assumed to be similar to that represented by Figs. 1–4 except that the connector sleeve in addition to the inner teeth 64 on its inner surface is provided with teeth 64a on its outer surface and the inner faces of the recesses in the flanges of the hubs are provided with corresponding teeth 61, the outer wall of the flange in this case being designated 62.

In this embodiment the inner and outer teeth are represented as having such angles that the corresponding side walls, in extension, would form an angle of about 90° with each other.

Fig. 13 is similar to Fig. 12 except that the angle between the corresponding surfaces, in extension, of the inner and outer teeth 65, 66, respectively, form angles of about 60°. In Fig. 13 the inner wall of the flange is designated 67 and the outer wall 68. In practice it has been found that such angle preferably should be somewhere between the 60° of Fig. 13 and the 90° of Fig. 12.

In Fig. 14 an embodiment of the invention is represented in which the shafts 1 and 2 have on their adjacent end portions connection hub members 70, 71, respectively. These hub members are composed of sleeve portions 72, 73 and annular flanges 75, 76, respectively. The outer edges of these flanges are provided with sets of teeth 77 (Fig. 15), extending therearound. A tubular connector 79 extends between the outer edges of said flanges 75, 76, and the end portions of the connector are provided with sets of teeth 80 which conform in size and shape with teeth 77 of said flanges and are in engagement therewith. Similarly, as in the previously disclosed embodiments the connector 79 is made of elastic material such molded rubber.

For preventing outward yielding of the ends of the connector 79 and for retaining the sets of teeth in engagement with each other, metallic bands 81 are slipped over the end portions of the connector 79. These bands are formed with inward bulges 82 extending therearound, which bulges are seated in annular depression 84 formed near the ends of the connector tube for holding the bands against longitudinal slipping and dislodgment in use. The bands 81 are placed in position by sliding them longitudinally onto the ends of the elastic sleeve whereupon they snap into securing position with their inward bulges 82 in depressions 84 and are removable by the reverse procedure.

The tubular connectors are held against longitudinal dislodgment in use by snap rings 86, 87 located in annular recesses 89, 90, in the outer peripheral faces of the flanges.

In the embodiment represented by Figs. 16 and 17 all features are similar to those of Figs. 14 and 15, except that the snap rings 86, 87 and grooves 89, 90 are omitted and in place thereof the ends of the tubular connector are provided with inwardly bulged retaining bands 91, 92 having inwardly extending flanges 94, 95 at their outer edges, extending inwardly to locations adjacent the axially remote faces 96, 97, of the flanges 75, 76. Between the inner faces of the sets of flanges 75, 94, and 76, 95 rubber washers 99 are placed to prevent contact between the flanges of said sets. The tubular connector 79 is restrained from movement in either direction by the flange of the band at its opposite end engaging the corresponding hub flange through their intermediate rubber washers 99.

In the embodiment represented by Figs. 18 and 19 the construction is similar in all respects to that of Figs. 14, 15, except that the outer end portions of 101, 102 of the tubular connector 100 are provided with flat recesses 103, 104 instead of the inwardly bulging recesses of Figs. 14, 15. Flat retaining bands 106, 107 are adhesively secured in recesses 103, 104, respectively. In this embodiment snap rings 109, 110 and annular recesses 111, 112 are employed for preventing undesired longitudinal movement of the tubular connector 100 in use.

Another form of retaining band 114 is shown in section in Fig. 20. This band is circular in cross section and seats in annular recesses 115 in the outer end portions of the tubular connector 116.

The cooperative relationship between the elastic sleeve connector and the hubs is such that the greater amount of power being transmitted the firmer will be the locking engagement between the teeth of the connector and hubs and thus the less the likelihood of any relative movement therebetween. This reduces the wear that might occur from frictional relative movement. On the other hand any relative movement between the hubs caused by slight misalignments of the shafts or abrupt changes in the power being transmitted will be taken up by flexure within the elastic connector itself thus reducing such frictional wear as might result from such misalignment. In operation the principal function of the elastic connectors is to transmit torsional power and since the connectors extend between spaced-apart shafts the portions of the connectors between the shaft hubs are subjected to torsional shear.

I claim:

1. A flexible coupling for connecting rotatable shafts end to end and transmitting power therebetween comprising, an elastic connector having angular formations at its end portions, a socket secured on each shaft end and facing each other, each of said sockets having a recess in its surface facing toward the opposing socket, said recesses conforming in shape to the formations of said connector end portions and said connector having its end portions seated in said sockets, the portions of said sockets engaging said end portions of said connector being spaced apart axially so that the portion of said connector between said portions of said sockets is flexed in torsional shear in transmitting power in operation.

2. A flexible coupling according to claim 1 and in which said elastic connector is in the form of a sleeve and said socket recesses are annular in shape.

3. A flexible coupling according to claim 2 and in which the angular formations are teeth formed on the inner surfaces of said end portions of said elastic sleeve, and said sockets are formed with corresponding teeth on the inner surface thereof engaging said teeth of said sleeve ends, respectively.

4. A flexible coupling according to claim 2 and in which said sleeve is split longitudinally for facilitating assembly and disassembly of the coupling.

5. A flexible coupling according to claim 4, and in which said split of said sleeve is a broken line.

6. A flexible coupling according to claim 5 and in which the broken line of said split is a zig-zag line forming interengaging teeth which resist longitudinal displacement of the edges of said split when under power transmitting load.

7. A flexible coupling according to claim 1 and in which said elastic connection is in the form of a sleeve, said socket recesses being annular in shape, said sleeve being split longitudinally, the edges of said sleeve at said split being formed with recesses and pins extending into said recesses to lock said edges to resist longitudinal displacement thereof when under power transmitting load.

8. A flexible coupling according to claim 3, and in which said sleeve is provided with further teeth located on the outer surface of its end portions and said sockets are provided with correspondingly shaped teeth on the inner surface of their outer walls engaging said further teeth.

9. A flexible coupling according to claim 8 and in which the angle formed between corresponding walls of said inner and outer teeth, in extension, is approximately between 60° and 90°.

10. A flexible coupling according to claim 2 and in which said angular formations are teeth formed on the outer surfaces of said end portions of said elastic sleeve, and said sockets are formed with corresponding teeth on the inwardly facing surface of the outer wall thereof engaging the teeth of said end portions, respectively.

11. A flexible coupling for connecting rotatable shafts end to end and transmitting power therebetween, comprising an elastic connector sleeve having angular formations at its end portions, a hub member on each shaft end, each of said hubs having angular formations thereon, conforming to and mating with the said formations on the corresponding end portion of the connector sleeve, means for retaining said formations of said connector ends and said hubs in driving engagement in operation, said angular formations of the respective hubs and said angular formations of said connector sleeve ends engaging therewith and said retaining means being spaced apart axially so that the portion of the connector sleeve between said hubs and retaining means is flexed in torsion in transmitting power, said connector sleeve being split longitudinally along a zig-zag line forming interengaging teeth which resist longitudinal displacement of the edges of said split when under power transmitting load.

12. A flexible coupling for connecting rotatable shafts end to end and transmitting power therebetween, comprising an elastic connector sleeve having angular formations at its end portions, a hub member on each shaft end, each of said hubs having angular formations thereon, conforming to and mating with the said formations on the corresponding end portion of the connector sleeve, means for retaining said formations of said connector ends and said hubs in driving engagement in operation, said angular formations of the respective hubs and said angular formations of said connector sleeve ends engaging therewith and said retaining means being spaced apart axially so that the portion of the connector sleeve between said hubs and retaining means is flexed in torsion in transmitting power, said elastic connector sleeve being split longitudinally, the edges of said sleeve at said split being formed with recesses, and pins extending into said recesses to lock said edges to resist relative longitudinal displacement thereof when under power transmitting load.

References Cited in the file of this patent

UNITED STATES PATENTS

| | | |
|---|---|---|
| 1,160,462 | Taylor | Nov. 16, 1915 |
| 1,646,427 | Skidmore | Oct. 25, 1927 |
| 1,775,556 | Hewel | Sept. 9, 1930 |
| 1,983,094 | Neher | Dec. 4, 1934 |
| 2,174,010 | Patterson | Sept. 26, 1939 |
| 2,271,567 | Olson | Feb. 3, 1942 |
| 2,337,287 | Williams | Dec. 21, 1943 |
| 2,560,644 | Hartzell | July 17, 1951 |
| 2,699,656 | Anderson et al. | Jan. 18, 1955 |

FOREIGN PATENTS

| | | |
|---|---|---|
| 372,866 | Germany | Apr. 15, 1923 |
| 207,400 | Great Britain | Nov. 29, 1923 |
| 839,967 | France | Jan. 7, 1939 |